(12) United States Patent
Martin et al.

(10) Patent No.: US 9,051,048 B2
(45) Date of Patent: Jun. 9, 2015

(54) MAIN LANDING GEAR BIAS AXLE STEERING

(71) Applicant: Goodrich Corporation, Charlotte, NC (US)

(72) Inventors: Dennis W. Martin, Woodinville, WA (US); James Acks, Medina, OH (US)

(73) Assignee: Goodrich Corporation, Charlotte, NC (US)

( * ) Notice: Subject to any disclaimer, the term of this patent is extended or adjusted under 35 U.S.C. 154(b) by 123 days.

(21) Appl. No.: 13/774,260

(22) Filed: Feb. 22, 2013

(65) Prior Publication Data

US 2014/0239120 A1  Aug. 28, 2014

(51) Int. Cl.
*B64C 25/50* (2006.01)
*B64C 25/34* (2006.01)

(52) U.S. Cl.
CPC ............ *B64C 25/50* (2013.01); *B64C 25/34* (2013.01)

(58) Field of Classification Search
USPC ......................................... 244/50; 180/24.01
See application file for complete search history.

(56) References Cited

U.S. PATENT DOCUMENTS

| | | | |
|---|---|---|---|
| 2,869,888 A * | 1/1959 | Burger | 280/442 |
| 3,285,541 A * | 11/1966 | Fehring et al. | 244/50 |
| 3,488,020 A * | 1/1970 | Scherer | 244/50 |
| 3,643,898 A * | 2/1972 | Whitener et al. | 244/50 |
| 3,903,979 A * | 9/1975 | Perrotin | 180/23 |
| 5,242,131 A * | 9/1993 | Watts | 244/103 W |
| 5,513,821 A | 5/1996 | Ralph | |
| 5,595,359 A | 1/1997 | Meneghetti | |
| 5,613,651 A | 3/1997 | Meneghetti | |
| 5,704,568 A * | 1/1998 | Watts | 244/50 |
| 5,743,491 A | 4/1998 | Meneghetti | |
| 6,123,292 A | 9/2000 | Ralph | |
| 6,308,916 B1 * | 10/2001 | Hrusch | 244/102 R |
| 6,641,085 B1 | 11/2003 | Delea et al. | |
| 6,671,588 B2 | 12/2003 | Otake et al. | |
| 6,805,320 B2 | 10/2004 | Derrien et al. | |
| 8,608,105 B2 * | 12/2013 | Bennett et al. | 244/50 |
| 8,668,163 B2 * | 3/2014 | Colantonio et al. | 244/50 |
| 2010/0078517 A1 | 4/2010 | Coles et al. | |
| 2011/0215192 A1 | 9/2011 | Colantonio et al. | |
| 2013/0193267 A1 * | 8/2013 | Hawksworth et al. | 244/50 |

* cited by examiner

*Primary Examiner* — Christopher P Ellis
*Assistant Examiner* — Medhat Badawi
(74) *Attorney, Agent, or Firm* — Kinney & Lange, P.A.

(57) ABSTRACT

A bias steered landing gear system comprises a bogie beam, a first landing gear axle pivotally mounted to the bogie beam, and a steering actuator assembly. The first landing gear axle is pivotable through an axle steering range which includes a maximum inboard steering angle and a maximum outboard steering angle. The steering actuator assembly is operable to apply a steering force to steer the first landing gear axle through the axle steering range between the maximum inboard steering angle and the maximum outboard steering angle. The maximum inboard steering angle is substantially larger than the maximum outboard steering angle.

18 Claims, 8 Drawing Sheets

MAIN LANDING GEAR BIAS AXLE STEERING

BACKGROUND

The described subject matter relates generally to aircraft landing gear, and more specifically to steering systems for aircraft landing gear.

Main landing gear for large aircraft have traditionally employed a telescoping shock-absorbing strut with a multi-wheel truck attached. Such structures can effectively handle and react various forces seen during ground maneuvers. In order to assist in turning the aircraft, reduce side loads acting upon landing gear during turns, and reduce tire scrubbing, main landing gears with six or more wheeled bogie beam configurations have utilized a steerable forward or aft axle. Most common approaches to provide for forward or aft axle steering have utilized hydraulic actuators connected to directly or indirectly push or pull the aft axle to the desired steering angle.

Traditional push-pull steering systems are sized to produce enough steering torque at the minimum moment arm. As a result, the available steering torque is higher than required for most of the steerable range. Further, these systems have traditionally been configured such that the midrange of the actuator stroke corresponds to a neutral or 0° steering position. This provides equal range of motion of the steerable axle(s) and equal maximum steering angles in both the clockwise and counterclockwise directions. However, this range is not always needed in aircraft with main landing gears installed laterally apart from the aircraft center line. As such, one or more of the steerable landing gear axles rarely, if ever, will need their full range of angular motion to avoid tire scrubbing.

SUMMARY

A bias steered landing gear system comprises a bogie beam, a first landing gear axle pivotally mounted to the bogie beam, and a steering actuator assembly. The first landing gear axle is pivotable through an axle steering range which includes a maximum inboard steering angle and a maximum outboard steering angle. The steering actuator assembly is operable to apply a steering force to steer the first landing gear axle through the axle steering range between the maximum inboard steering angle and the maximum outboard steering angle. The maximum inboard steering angle is substantially larger than the maximum outboard steering angle.

A combination main landing gear system comprises a left-side bias steered landing gear system and a right-side bias steered landing gear system. The left-side bias steered landing gear system comprises a left-side bogie beam, a first left-side landing gear axle pivotally mounted to the left-side bogie beam, and a left-side steering actuator assembly. The right-side bias steered landing gear system comprises a right-side bogie beam, a first right-side landing gear axle pivotally mounted to the right-side bogie beam, and a right-side steering actuator assembly. The first left- and right side landing gear axles are pivotable through respective left-side and right-side axle steering ranges, each of which include a maximum clockwise steering angle larger than a maximum counterclockwise steering angle. The left-side and right-side steering actuator assemblies are operable to apply a steering force to steer the respective first left-side and right-side landing gear axles through the respective left-side and right-side axle steering ranges.

An aircraft comprises at least one bias steered main landing gear system configured to be laterally spaced apart from an aircraft center line, and disposed on a lower portion of a fuselage between a nose section and a tail section. The at least one bias steered main landing gear system comprises a bogie beam, a first landing gear axle pivotally mounted to the bogie beam, and a steering actuator assembly. The steering actuator assembly is operable to apply a steering force to steer the first landing gear axle through a steering range between a maximum inboard steering angle and a maximum outboard steering angle. The maximum inboard steering angle is substantially larger than the maximum outboard steering angle.

DETAILED DESCRIPTION

Figure 1:
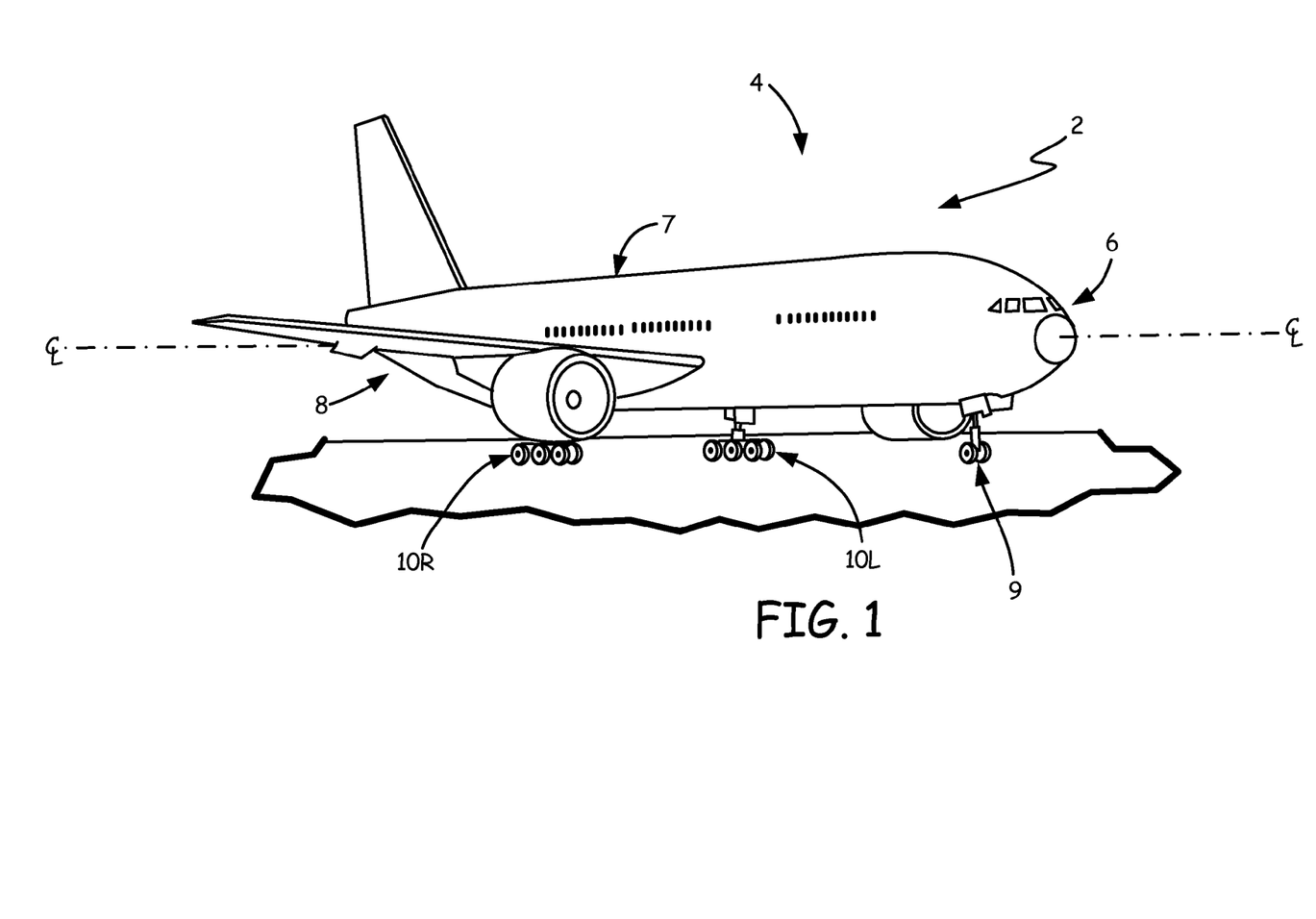
FIG. 1 shows an example aircraft with a nose gear and with two main landing gear assemblies on either side of the fuselage.

FIG. 1 shows aircraft 2 with fuselage 4 having nose section 6, wing section 7, and tail section 8. Aircraft 2 also includes primary steering gear 9, left-side main landing gear system 10L, and right-side main landing gear system 10R.

In FIG. 1, aircraft 2 is shown as a conventional commercial airliner. Fuselage 4 includes nose section 6, wing section 7, and tail section 8 with aircraft center line CL extending longitudinally therethrough. Primary steering gear 9 is a nose gear disposed on a lower portion of fuselage 4 along center line CL, and is generally operable to steer aircraft 2 during taxiing or other ground maneuvers. FIG. 1 also shows main landing gear systems 10L, 10R disposed on a lower portion of fuselage 4, aft of primary steering gear 9, proximate wing section 7.

Example aircraft 2 is shown with a combination main landing gear system including respective left-hand and right-hand main landing gear systems 10L, 10R spaced equally laterally apart from aircraft center line CL. It will be appreciated that the described subject matter can be adapted to other landing gear configurations as well. Additionally, aircraft 2 need not be a conventional commercial passenger airliner as shown in FIG. 1. For example, some very large cargo and passenger aircraft can include multiple main landing gear assemblies on both the left side and the right side of the aircraft laterally spaced from the center line. In certain alternative embodiments, aircraft 2 does not have a distinct fuselage and wings, but can instead be of a delta-wing or other less common aircraft design. It should also be noted that the figures are not necessarily to scale, and are merely provided as non-limiting illustrations.

While primary steering gear 9 provides much of the steering control for aircraft 2, main landing gear systems 10L, 10R can also be provided with one or more steerable axles to prevent tire scrubbing and otherwise improve maneuverability. As used throughout the specification, the inboard landing gear will be described as the one closest to the center or midpoint of the aircraft turning circle, while the outboard landing gear will be described as the one furthest from the center or midpoint of the aircraft turning circle (See, e.g., turning midpoint M in FIGS. 2A and 2B). Thus in the following examples, when aircraft 2 makes a left turn, left side main landing gear system 10L is the inboard landing gear, and right side landing gear system 10R is the outboard landing gear. During a right turn, these references are reversed, such that right side landing gear system 10R is inboard, and left side landing gear system 10L is outboard. Based on the relative turning radii, main landing gear systems 10L, 10R can include one or more bias steered axles each with a maximum inboard steering angle substantially larger than the maximum outboard steering angle.

Figure 2A:
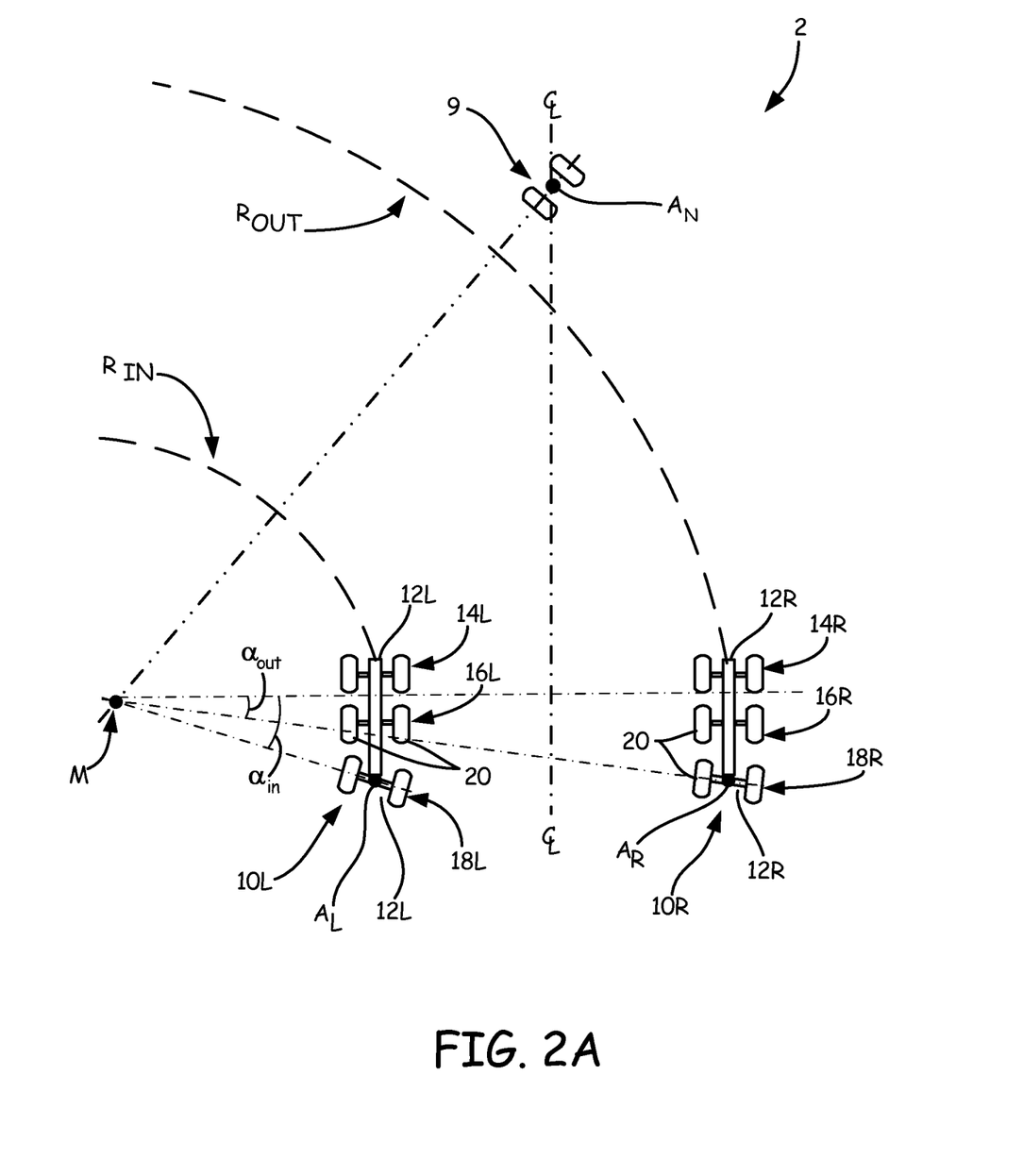
FIG. 2A is an example left turn track of the aircraft shown in FIG. 1.
Figure 2B:
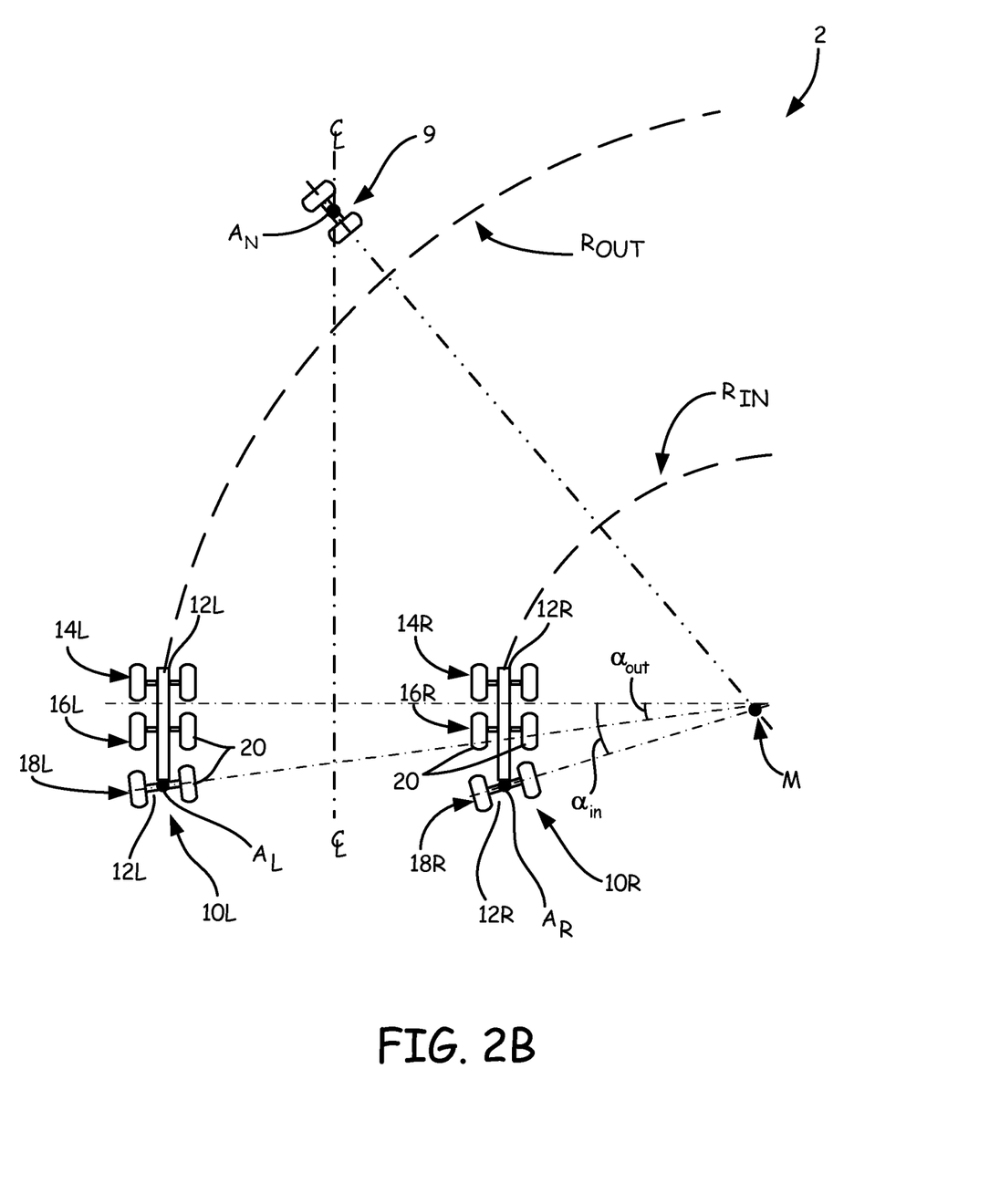
FIG. 2B is an example right turn track of the aircraft shown in FIG. 1.

FIG. 2A shows an example left-hand turning track for aircraft 2, and FIG. 2B shows an example right-hand turning track. FIGS. 2A and 2B also include bogie beams 12L, 12R fixed forward axles 14L, 14R, fixed center axles 16L, 16R, aft axles 18L, 18R, and wheels 20. Primary steering gear 9 is shown as a conventional nose gear but can be any suitable nose or tail steering configuration known in the art. In this example, main landing gear systems 10L, 10R are each shown as a three-axle bogie beam configuration with six wheels. Main landing gear systems 10L, 10R include longitudinally spaced apart forward axles 14L, 14R, center axles 16L, 16R, and aft axles 18L, 18R, each axle having two wheels 20. In the example shown, fixed forward axles 14L, 14R, and center axles 16L, 16R, are mounted generally transverse to respective bogie beams 12L, 12R. Aft axles 18L, 18R are pivotally mounted to respective bogie beams 12L, 12R.

FIGS. 2A and 2B show pivotable axles 18L, 18R, respectively mounted aft of fixed axles 14L, 14R, 16L, 16R. However, this example configuration is not limiting. In certain embodiments, a bias steering can be incorporated with one or more pivotable forward axles in addition to, or in lieu of, the pivotable aft axle. For example, axle steering arrangements may be provided to steer multiple pivotable axles such as a forward axle and an aft axle. Additionally or alternatively, a landing gear system can comprise more than three total axles.

In the absence of steerable axles, during ground maneuvers, the inboard landing gear experiences significant tire scrubbing and stress relative to the outboard landing gear. To alleviate these impacts in larger aircraft, main landing gear systems disposed laterally apart from the aircraft center line have previously been outfitted with one or more steerable axles. Traditionally, axles and their respective steering actuators, provide equal range of steering motion in both the clockwise (+) and counterclockwise (−) directions.

FIG. 2A shows a left hand turn configuration with aft axle 18L rotated clockwise about left-hand pivot axis $A_L$, and aft axle 18R rotated clockwise about right-hand pivot axis $A_R$. FIG. 2B shows a right hand turn with aft axle 18L rotated counterclockwise about left-hand pivot axis $A_L$, and aft axle 18R rotated counterclockwise about right-hand pivot axis $A_R$.

In the landing gear configuration shown, during a left-hand turn of aircraft 2, left-side main landing gear system 10L follows smaller inboard turning track with inboard radius $R_{in}$. This track is closer to midpoint M relative to right-side main landing gear system 10R, which follows larger outboard turning track with outboard radius $R_{out}$. Contrasted with FIG. 2B, which shows a right-hand turn of aircraft 2, left-side main landing gear system 10R follows larger outboard turning track with outboard radius $R_{out}$, while right-side main landing gear system 10R follows smaller inboard turning track with inboard radius $R_{in}$.

While not to scale, it can be seen in FIGS. 2A and 2B that aft axles 18L, 18R rarely if ever need an equal steering range in both clockwise and counterclockwise directions about their relative pivot axes $A_L$, $A_R$. With main landing gear systems 10L, 10R laterally spaced apart from aircraft center line CL, aft axle 18L requires a much larger maximum steering range and maximum inboard steering angle ($\alpha_{in}$) during an aircraft left turn as compared to a maximum steering range and maximum outboard steering angle ($\alpha_{out}$) of aft axle 18R. Similarly, aft axle 18R requires a much larger maximum steering range and steering angle ($\alpha_{in}$) during an aircraft right turn as compared to a maximum steering range and maximum outboard steering angle ($\alpha_{out}$) of aft axle 18L. To achieve this, the pivotable axle can be biased clockwise or counterclockwise (depending on the side of the aircraft and location of the pivotable axle forward or aft of turning midpoint M). This configuration permits a full steering range achieving both a smaller minimum inboard turning radius and a larger outboard turning radius of each main landing gear system 10L, 10R, while reducing size and weight, as well as aircraft power required to operate the steering actuator(s).

Thus, axles 18L, 18R can be provided with a steering arrangement where a midpoint of the steering range of each steerable axle is offset, or biased, relative to a neutral steering position. As a result, this bias steering arrangement can take advantage of the reduced angular deflection of axles 18L, 18R that occurs when respective main landing gear system 10L, 10R is on the outboard side of the turn, as compared to the inboard side.

Since main landing gear systems 10L, 10R are disposed aft of turning midpoint M, aft axles 18L, 18R generally pivot about their respective axes $A_L$, $A_R$ opposite the rotational direction of primary steering gear 9 about its own pivot axis $A_N$. In many instances, this configuration reduces stresses and tire scrubbing because the steerable/pivotable aft axles 18L, 18R are disposed on an opposite (forward or aft) side of turning midpoint M. This can make it easier for primary steering gear 9 and main landing gear systems 10L, 10R to follow their respective turning tracks in the same (clockwise or counterclockwise) direction.

A bias steering arrangement, several examples of which are shown in subsequent figures, can be used with one or more pivotable/steerable axles of a bogie style landing gear system, such as, but not limited to, a six-wheel bogie style landing gear system. The following figures show different example configurations of steering actuators and other elements that can be adapted to form a bias steering arrangement for a pivotable landing gear axle such as aft axles 18L, 18R. However, it will be appreciated that the described subject matter can be readily adapted to this or other alternative axle steering configurations. While described with respect to aft axles 18L, 18R being pivotable/steerable, it will be appreciated that the subject matter can be readily adapted to any landing gear system comprising at least one pivotable/steerable landing gear axle.

Figure 3:
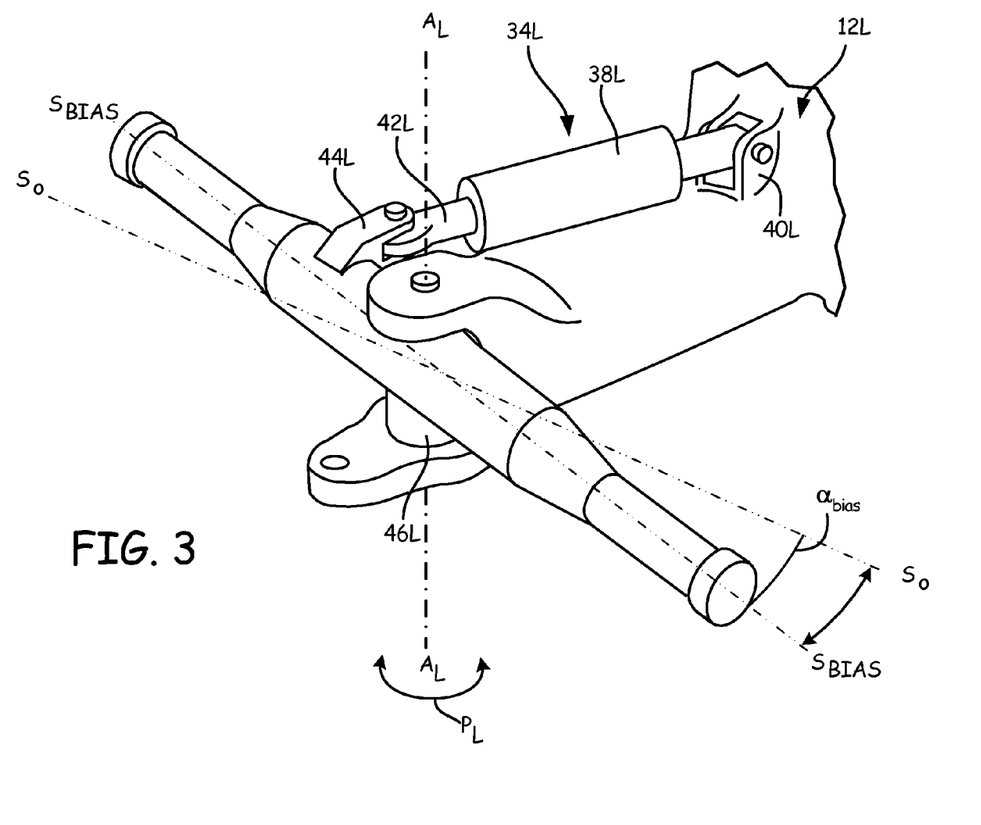
FIG. 3 shows an example embodiment of a bias steered axle assembly for the left-side main landing gear system.

FIG. 3 is a perspective view of an aft portion of left-side main landing gear system 10L, showing aft axle 18L and bias steering arrangement 30L. FIG. 3 also shows bogie beam 12L, actuator 34L, actuator cylinder end 38L, actuator mount 40L, actuator piston end 42L, axle socket lug 44L, and axle pivot pin 46L.

Figure 6A:
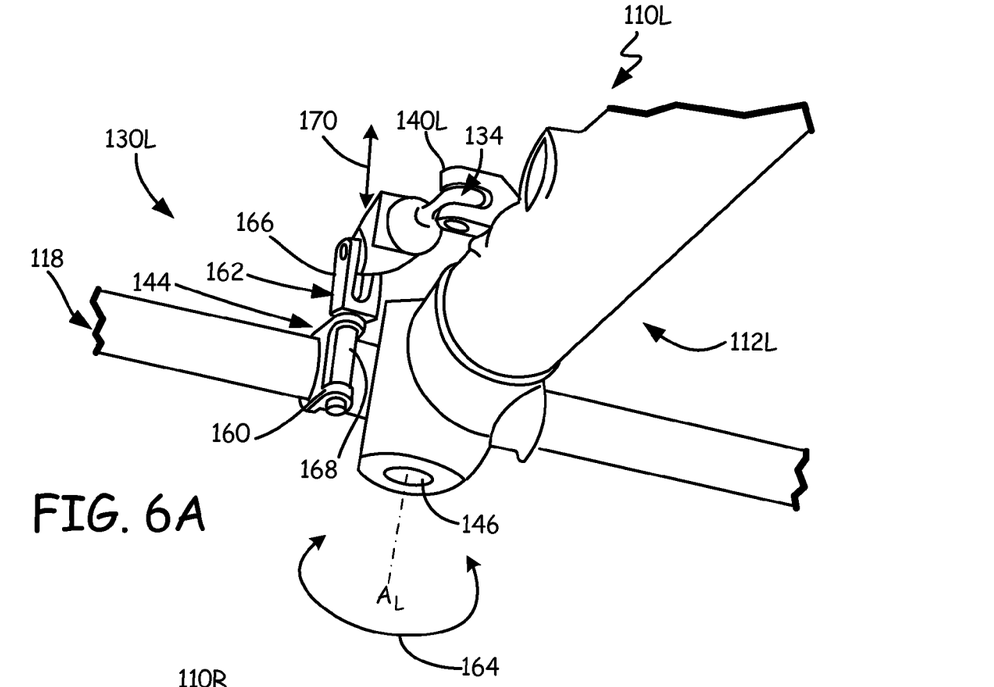
FIG. 6A is a detailed aft facing view of a left-side bias steered axle assembly.
Figure 6B:
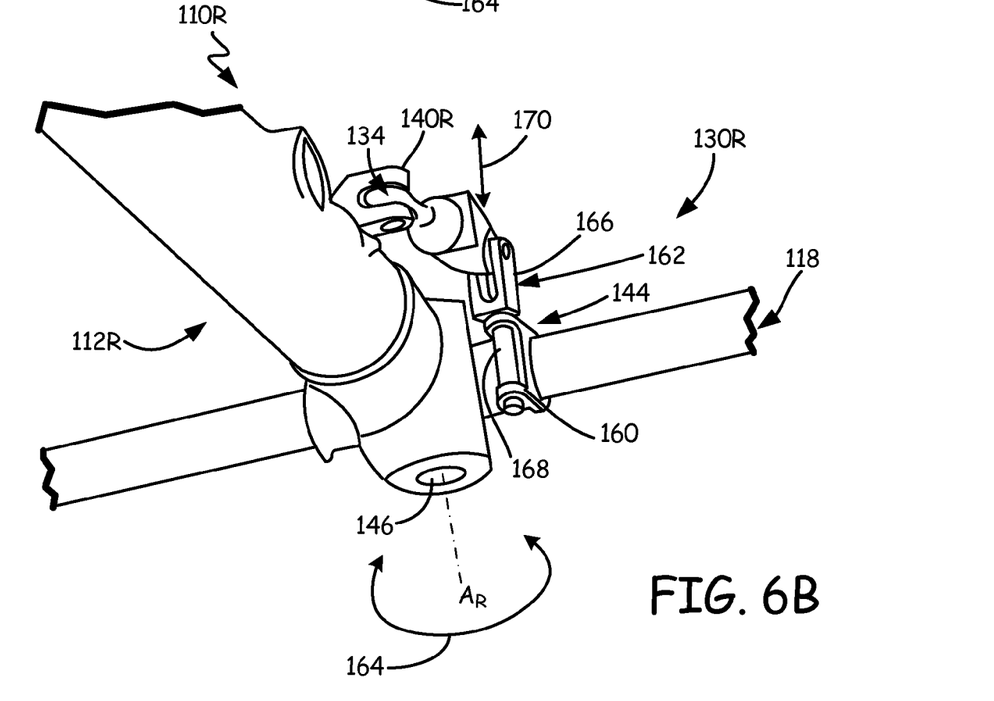
FIG. 6B is a detailed aft facing view of a right-side bias steered axle assembly.

With reference to FIG. 3, example left side bias steering arrangement 30L is shown for aft axle 18L of left-side main landing gear system 10L. It will be appreciated that aft axle 18R of main landing gear system 10R (shown in FIGS. 2A and 2B) can be outfitted with a corresponding right side bias steering system. Except where noted, references to left-side elements are generally applicable to right-side elements by way of a mirror image across aircraft center line CL (shown in FIGS. 2A and 2B). In certain embodiments, an interchangeable bias steering arrangement can be provided that utilizes several common steering and axle components in both left-side and right-side main landing gear systems 10L, 10R (shown in FIGS. 2A and 2B). One such example embodiment is shown in FIGS. 6A-6B.

As was shown in FIGS. 1, 2A, and 2B, bogie beam 12L includes two or more axles forward of pivotable aft axle 18L, but for sake of clarity only the aft portion of bogie beam 12L is shown in FIG. 3. Aft axle 18L is pivotable about left-hand pivot axis $A_L$ in directions indicated by arrow $P_L$. Aft axle 18L is pivotable through a steering range, which can include maximum inboard and outboard steering angles relative to a neutral steering position $S_0$. Bias steering arrangement 30L includes actuator 34L which directly or indirectly pushes and pulls aft axle 18L to a desired steering position S.

Actuator 34L can be coupled at one end to bogie beam 12L and at the other end to axle 18L. In this example, actuator 34L is a linear actuator with cylinder end 38L secured or fastened to bogie beam 12L at actuator mount 40L. Actuator mount 40L is spaced longitudinally apart from axle 18L, and may be closer to axle 16L (shown in FIGS. 2A and 2B). Actuator cylinder end 38L uses fluid pressure or electromotive forces to actuator piston end 42L, which is pivotally engaged with axle 18L via axle socket lug 44L. Axle socket lug 44L is spaced laterally apart from axle pivot pin 46L and left-hand pivot axis $A_L$ which is inserted normal to bogie beam 12L. Axle socket lug 44L can include, for example, a clevis or other structure capable of maintaining pivotable engagement of actuator piston end 42L and aft axle 18L. Axle socket lug 44L can be removable from, or integrally formed with, aft axle 18L.

The driving forces applied by actuator 34L operate to apply a steering force and steer aft axle 18L through the axle steering range. The axle steering range includes maximum clockwise and counterclockwise steering angles (shown in FIGS. 4A-4C) relative to neutral steering position $S_0$. In certain embodiments, the relative magnitudes of maximum clockwise and counterclockwise steering angles differ and can correspond to a maximum inboard steering angle and a maximum outboard steering angle. In FIG. 3, hydraulic actuator 34L is configured at approximately 50% stroke, or a midpoint of its actuation range. In a conventional steering arrangement, about 50% stroke would correspond to axle 18L being disposed in or proximate the neutral steering position $S_0$ (e.g., 0°) in order to provide substantially equal steering range in both the clockwise (+) and counterclockwise (−) directions. For example, a conventional axle steering arrangement may have one or more pivotable landing gear axles with a steering range of +/−15° relative to a neutral steering position. To achieve this full example steering range of 30°, actuator 34L must be sized and powered to allow it to drive axle 18L equally to both extremes (i.e., 15° in both clockwise and counterclockwise directions).

However, it was shown in FIGS. 2A and 2B that steerable axles for main landing gears need not have equal maximum steering ranges in both the clockwise and counterclockwise directions. This is particularly true in cases such as example main landing gear systems 10L, 10R being disposed laterally apart from aircraft center line CL. Though the maximum outboard steering angle of axles 18L, 18R is smaller than those in conventional steerable landing gear configurations, the steering ranges of axles 18L, 18R can be tailored to the turning requirements of the aircraft. Thus both a left hand turn and a right hand turn can be achieved using smaller, lighter actuators. As such, each aft axle 18L, 18R can be biased away from their neutral steering position $S_0$, and to bias steering position $S_{bias}$ so that $S_{bias}$ can be the midpoint of the steering range of each aft axle 18L, 18R. At bias steering position $S_{bias}$, axles 18L, 18R each form nonzero bias steering angle $\alpha_{bias}$ relative to neutral steering position $S_0$.

Figure 4A:
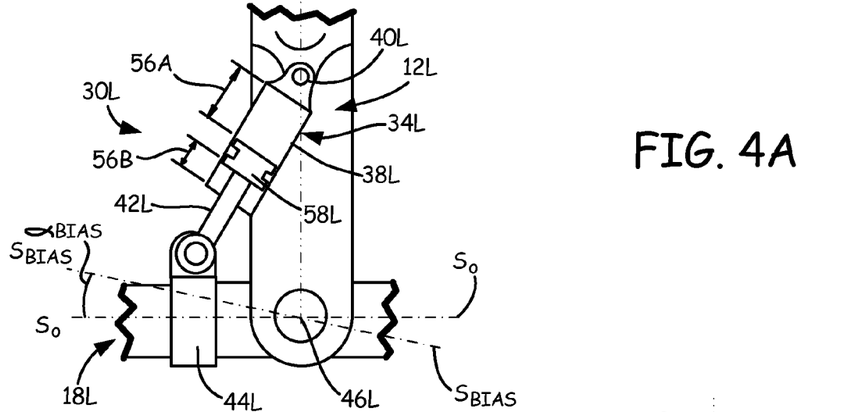
FIG. 4A is a sectional view of the left-side bias steered axle assembly in a first (neutral) steering position.
Figures 4B, 4C:
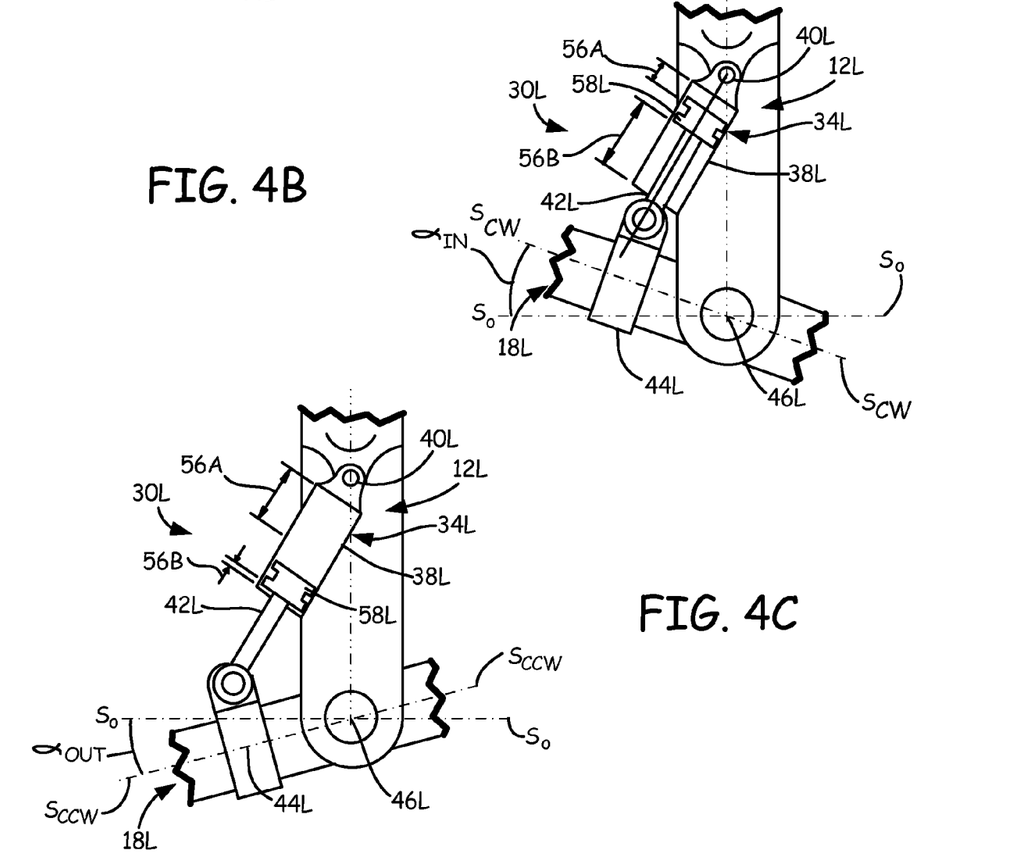
FIG. 4B is a sectional view of the left-side bias steered axle assembly in a second (clockwise) steering position for an inboard turn.
FIG. 4C is a sectional view of the left-side bias steered main landing gear in a third (counterclockwise) steering position for an outboard turn.

In the example left-side main landing gear system 10L shown in FIG. 3, biasing axle 18L in a clockwise direction provides a larger maximum inboard steering angle and a smaller maximum outboard steering angle (shown in FIGS. 4A-4C). This conforms to the respective left hand and right hand turns shown in FIGS. 2A-2B. Thus actuator 34L can in turn be biased with reduced size and power requirements to still allow it to drive axle 18L to the limits that will actually be useful during operation. Similarly aft axle 18R on main landing gear system 10R (shown in FIGS. 2A-2B) can be provided with a similar but opposing bias steering position $S_{bias}$ in a counterclockwise direction about right-hand pivot axis $A_R$. This also provides a larger maximum inboard and smaller maximum outboard steering angle on the right side of the aircraft. In certain embodiments, the maximum left-hand and right-hand axle steering ranges can be equal for each side as required by the geometry, therefore allowing for a common biased configuration on both right and left hand main landing gear systems (See, e.g., FIGS. 6A-6B).

The bases of the actual steering strokes and resulting maximum steering angles of each axle are adapted to the specific maneuverability, weight, and operational requirements of a particular aircraft and landing gear geometry. For example, the steering range of a particular bias steered axle can depend on the relative and actual distances of the landing gear with respect to the aircraft turning radius and corresponding location of turning midpoint M (shown in FIGS. 2A and 2B). In certain embodiments, nonzero bias steering angle $\alpha_{bias}$ is at least about 3° in a clockwise or counterclockwise direction. In certain of these embodiments, nonzero bias steering angle $\alpha_{bias}$ is at least about 6° in a clockwise or counterclockwise direction.

Further, it should be noted that maximum axle steering angles described herein can, in certain embodiments, refer to the absolute maximum axle steering angle defined by mechanical limitations of a particular aircraft and landing gear configuration. However, the maximum inboard and outboard axle steering angles, as well as the bias steering angle, can also refer to the maximum axle steering angles when taking into account various design and tolerance factors of both the aircraft and the landing gear system. These can include thermal effects, actuator over-travel, and other miscellaneous design considerations that may prevent the absolute maximum axle steering angles from being realized in most normal operating conditions.

Aft axle 18L and/or actuator 34L can be locked in place via a suitable optional locking mechanism (omitted for clarity).

Numerous example locking mechanisms can be adapted to engage the steering mechanism and/or the aft axle 18L to maintain aft axle 18L in a desired steering position and angle relative to bogie beam 12L. In certain embodiments, the desired steering angle is the neutral (e.g., 0°) steering position so that unintended steering inputs or outputs can be avoided. In these embodiments, since axle 18L is disposed at angle $S_{bias}$ with actuator 34L substantially at midstroke, it will be recognized that the locking mechanism will be configured to cause engagement at an actuator position substantially more or less than 50%. Various examples of locking mechanisms are known in the art and need not be detailed here.

FIGS. 4A-4C show left-side landing gear system 10L with detailed sectional views of bias steering arrangement 30L corresponding to steering positions of aft axle 18L. FIG. 4A depicts steering arrangement 30L with actuator 34L retaining aft axle 18L at a neutral steering position $S_0$. FIG. 4B shows actuator 34L fully retracted to achieve a maximum clockwise, or inboard, steering angle of aft axle 18L. FIG. 4C shows actuator 34L fully extended to achieve a maximum counter-clockwise, or outboard, steering angle of aft axle 18L. FIGS. 4A-4C also show actuator cylinder end 38L, actuator mount 40L, actuator piston end 42L, axle socket lug 44L, axle pivot pin 46L, actuation spaces 56A, 56B, and piston 58L.

FIG. 4A shows left hand main landing gear system 10L with aft axle 18L at neutral steering position $S_0$. FIG. 4B shows aft axle 18L at steering position $S_{cw}$, which corresponds to FIG. 2A in which aircraft 2 is making a left-hand turn with left-side main landing gear system 10L generally following inboard turning track $R_{in}$. FIG. 4C shows aft axle 18L at steering position $S_{ccw}$, which corresponds to FIG. 2B in which aircraft 2 is making a right-hand turn with left-side main landing gear system 10L generally following outboard turning track $R_{out}$.

As was shown and described with respect to FIGS. 2A and 2B, minimum inboard turning radius $R_{in}$ is smaller than minimum outboard turning radius $R_{out}$. FIGS. 4A-4C show aft axle 18L with a corresponding asymmetric steering range with maximum inboard steering angle $\alpha_{in}$ of aft axle 18L being larger, or higher magnitude as compared to maximum outboard steering angle $\alpha_{out}$. Bias steering arrangement 30L can be adapted to the asymmetric steering range by biasing aft axle 18L in the clockwise direction to steering position $S_{bias}$ (shown in FIG. 4A) forming bias steering angle $\alpha_{bias}$ relative to neutral steering position $S_0$. Actuator 34L can be similarly biased to better conform the stroke or other actuation range to the asymmetric steering range of aft axle 18L.

With reference to FIG. 4A, actuator 34L is extended beyond midstroke to counteract the clockwise bias $S_{bias}$ of axle 18L (shown in FIG. 3), and return aft axle 18L to neutral steering position $S_0$. This is illustrated by usable actuation space 56A above actuator piston 58L being larger than usable space 56B below piston 58L. The exact position, relative stroke, and usable actuation spaces of actuator 34L (or its equivalent) are generally based on a number of factors including the actuator design, actuator over-travel, the degree of bias imparted to the axle, as well as the overall steering range and actuator range. In a design of this general type, (e.g., a push-pull type actuator 34L pivotally engaged at an outboard side of axle 18L), the actuator stroke will be substantially greater than 50%. In one non-limiting example, bias steering $S_0$ can be achieved with at an actuator stroke equal to or greater than about 60% of its range. It will be recognized that a push-pull actuator pivotally engaged at an inboard side of a pivotable axle will generally require the actuator stroke to be substantially less than 50% (e.g., equal to or less than about 40%). As noted above, the bases of the actual steering strokes, steering angles, and resulting actuator position will be a result of the specific aircraft and landing gear configurations relative to aircraft turning midpoint M (shown in FIGS. 2A and 2B).

FIGS. 4B and 4C show bias steering arrangement 30L and aft axle 18L during respective left-hand (inboard) and right-hand (outboard) aircraft turns. In FIG. 4B, actuator 34L is fully retracted (i.e., at or near 0% stroke), which is illustrated by usable actuation space 56A above actuator piston 58L being at or near its minimum, while usable space 56B below piston 58L is at or near its maximum. This pulls actuator piston end 42L, and aft axle 18L, toward actuator cylinder end 38L to effect a full clockwise steering input and steering position $S_{cw}$. To achieve turning track $R_{in}$ (shown in FIG. 2A) with minimal tire scrubbing, FIG. 4B shows actuator 34L in a retracted state to provide a steering motion to aft axle 18L, pivoting it about pivot pin 46L to clockwise steering position $S_{cw}$. Clockwise steering position $S_{cw}$ defines positive maximum steering angle $\alpha_{in}$ relative to neutral steering position $S_0$.

Similarly, in FIG. 4C, actuator 34L is fully extended (i.e., at or near 100% stroke), which is illustrated by usable actuation space 56A above actuator piston 58L being at or near its maximum, and usable space 56B below piston 56L being at or near its minimum. This pushes aft axle 18L away from actuator cylinder end 38L (using actuator piston end 42L) to effect a full counterclockwise steering input. To achieve turning track $R_{out}$ (shown in FIG. 2B) with minimal tire scrubbing, FIG. 4C shows actuator 34L in an extended state to provide a steering motion to aft axle 18L, pivoting it about pivot pin 46L to counterclockwise steering position S. Counterclockwise steering position $S_{ccw}$ defines negative maximum steering angle $\alpha_{out}$ relative to neutral steering position $S_0$.

Briefly returning to the example of FIG. 3 where the maximum desired or required magnitude of either the clockwise or counterclockwise axle steering angle is +/−15° (conventional axle range of 30°). In the example left turn shown in FIGS. 2A and 4B, axle 18L would thus need the full steering range of 15° only in the clockwise (+) direction to achieve an inboard steering angle $\alpha_{in}$ of about +15°. In the counterclockwise (−) direction, axle 18L requires less steering range (for example, $\alpha_{out}$ is about −5°) to help the aircraft achieve a right turn along the outboard turning track. Axle 18L is then biased at bias steering angle $\alpha_{bias}$ of about +5° (about halfway between 15° and −5°) relative to neutral, when actuator 34L is approximately at 50% stroke. Thus the total effective steering range is only 20° (10° in either direction when bias steering angle $\alpha_{bias}$ is about 5°). This is substantially less than the conventional range steering range of 30° when axle 18L is not biased in either direction (15° in either direction from neutral steering position $S_0$). However, actuator 34L thus need only be sized for a 20° range (instead of) 30° when it is biased consistent with a bias steering angle $\alpha_{bias}$ of about +5°.

It will be recognized that a right side main landing gear system can be provided with a similar bias steering arrangement (e.g., system 1 OR shown in FIGS. 2A and 2B) As was shown and described with respect to FIGS. 2A and 2B, minimum inboard turning radius $R_{in}$, and resulting maximum steering angle $\alpha_m$ of aft axle 18R will be larger for right-hand turns than minimum outboard radius $R_{out}$ and resulting maximum steering angle $\alpha_{out}$ for left-hand turns. As such, a right-hand bias steering arrangement can be adapted in a similar manner to left-hand bias steering arrangement 30L described above. This allows right-side main landing gear system 10R to accommodate the smaller inboard turning radius required for right-hand turns by biasing aft axle 18R with a counterclockwise bias angle $\alpha_{bias}$ of similar or equal magnitude toward maximum counterclockwise steering position $S_{ccw}$.

Figure 5:
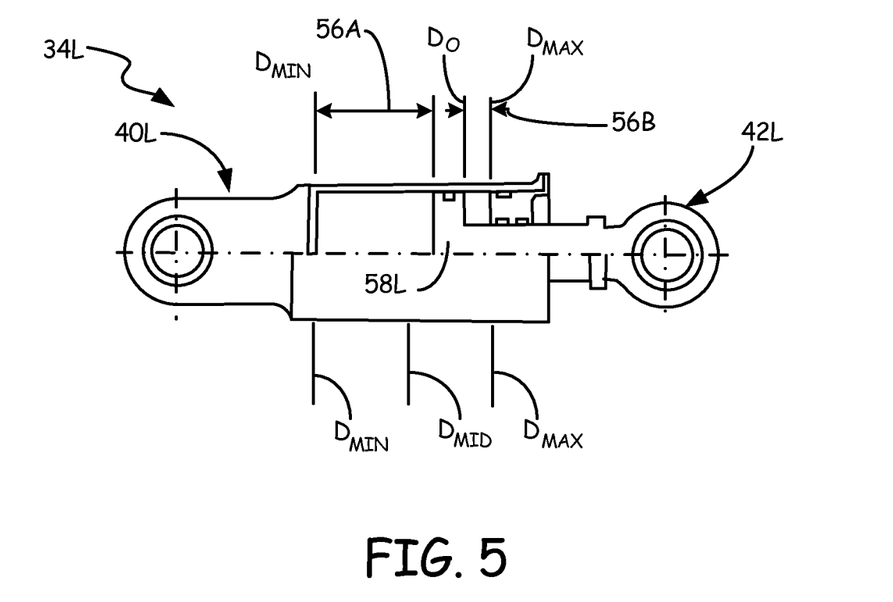
FIG. 5 shows the relative position and stroke of an example push-pull actuator for use in a bias steering arrangement.

FIG. 5 is a partial sectional view of an example single piston actuator 34L showing the actuation range and relative actuation points for the steering positions shown in FIGS. 3-4C. In example single-piston actuator 34L, as shown in FIG. 5, actuator piston 58L ranges between minimum actuator stroke $D_{min}$ (i.e., about 0% stroke), and maximum actuator stroke $D_{max}$ (i.e., about 100% stroke). Actuator position $D_0$ corresponds to neutral steering position $S_0$ (shown in FIG. 4A), while $D_{mid}$ represent a midstroke or 50% stroke position of actuator 34L, which corresponds generally to bias steering position $S_{bias}$ shown in FIG. 3.

In FIG. 5, it can be seen that $D_0$ is closer to $D_{max}$ than $D_{min}$, similar to FIG. 4A which also shows upper actuation space 56A being larger than lower actuation space 56B. This is the general orientation for an actuator mounted on the outboard side of pivot pin 46L as seen in the above examples. This relative configuration also holds for axle 18R (shown in FIGS. 2A and 2B) with an actuator (not shown) also mounted on an outboard side of axle 18R. To overcome the corresponding counterclockwise steering bias, $D_0$ would need to be closer to $D_{max}$ than $D_{min}$ on an outboard mounted actuator. However, it will be understood that other arrangements may have a different actuator configuration, potentially necessitating $D_0$ to be closer to $D_{min}$ than $D_{max}$ to overcome the bias of the axle and move it into a neutral steering position substantially transverse to the bogie beam.

The examples shown in FIGS. 3-5 depict a dedicated left side bias axle steering arrangement, which can be adapted to a right-side arrangement by producing mirror image steering and/or axle components. Alternatively, one or more steering and/or axle components can be produced which allow the same parts to be used on either side of the aircraft merely by installing them in a different orientation. This can be seen in FIGS. 6A and 6B.

FIGS. 6A and 6B show detailed aft-facing views of respective left side and right side landing gear systems 110L, 110R containing common steering and axle components usable on either side of an aircraft. FIGS. 6A and 6B also show left-side and right-side bogie beams 112L, 112R, common aft axle 118, bias steering arrangements 130L, 130R, axle socket lug 144, pivot pin 146, axle clevis 160, socket pin 162, axle inversion direction 164, socket pin actuator end 166, socket pin clevis end 168, and socket pin assembly direction 170.

FIGS. 6A and 6B show one example embodiment of left side and right side main landing gear systems 110L, 110R. These have a reversible configuration allowing a common actuator 134 and aft axle 118 to be installed on either side of the aircraft while still maintaining the bias configuration shown in the preceding example. Actuator mount 140 is disposed on the outboard side of both left-side bogie beam 112L and right-side bogie beam 112R. Axle 118 includes axle socket lug 144 with axle clevis 160 facing actuator 134 and configured to receive socket pin 162. Simply by inverting or flipping axle 118 in direction 164 (about the center line of bogie beam 112L or 112R, socket lug 144 with axle clevis 160 can be disposed on the correct (e.g., outboard) side of pivot pin 146 and pivot axes $A_L$, $A_R$. Axle 118 can thus be produced and assembled into the correct bias orientation (clockwise or counterclockwise) with actuator 134 being pivotally engaged with socket lug 144 of axle 118 on the outboard side of either left bogie beam 112L or right bogie beam 112R.

Here, socket pin 162 includes actuator end 166 and clevis end 168. Clevis end 168 of socket pin 162 can be inserted and removed (in pin assembly direction 170) such that clevis end 168 is retained through axle clevis 160. Actuator 134 is operably engaged with actuator end 166 of socket pin 162 and is subsequently retained, for example, by one or more conventional pins, cotter pins, clamps, or the like (not shown). Axle 118, axle clevis 160, and socket pin 162 enables axle steering arrangement 130 to operate in the same manner on both main landing gear systems 110L, 110R, without the need to provide a different axle, bogie beam, and/or fastener configurations for each landing gear axle. In turn, the common components reduce inventory requirements and reduce assembly errors caused by mistakenly selected parts.

The first two example embodiments of a bias axle steering arrangement with respect to a push-pull type steering actuator. However, it will be appreciated that this disclosure is not so limited. For example, the example bias steering arrangements described above can be adapted to include rack-type steering arrangements. A brief non-limiting description of an example steering arrangement incorporating both rack-type elements and bias elements is shown and described with reference to FIG. 7.

Figure 7:
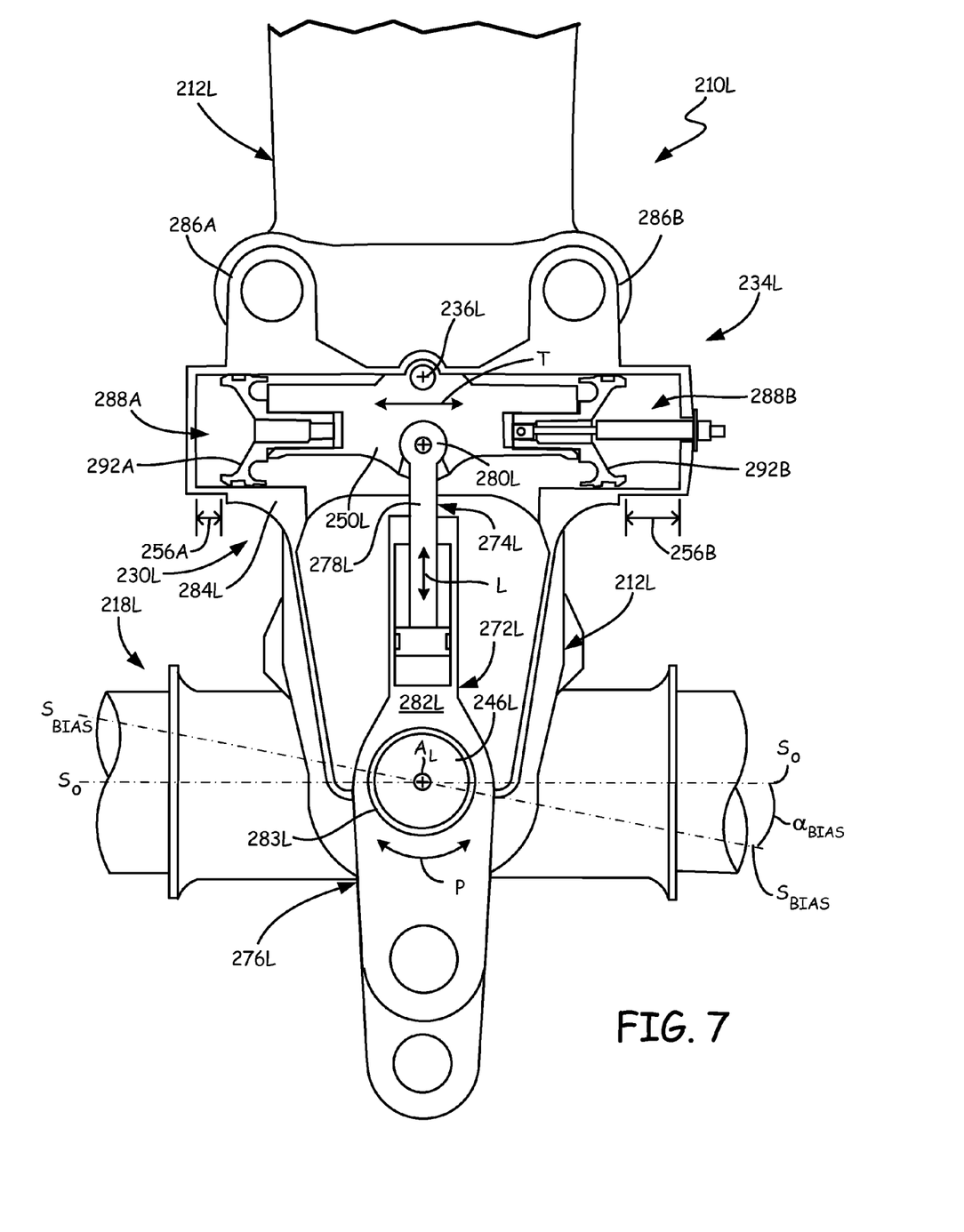
FIG. 7 shows a sectional view of an example embodiment of a rack-type bias-steered axle assembly.

FIG. 7 shows a sectional view of an alternative bias steering arrangement 230L for left side main landing gear system 210L. FIG. 7 also shows bogie beam 212L, axle 218L, actuator assembly 234L, locking mechanism 236L, axle pivot pin 246L, steering rack 250L, actuation spaces 256A, 256B, control link 272, control link actuator end 274L, control link axle end 276L, control link arm 278L, rack pin 280L, control link body 282L, bore 283L, actuator housing 284L, bogie beam attachment regions 286A, 286B, actuators 288A, 288B, and actuator piston heads 292A, 292B.

FIG. 7 shows an example rack-type bias steering arrangement 230L for a left-side main landing gear system (e.g., main landing gear system 10L shown in FIGS. 2A and 2B). In place of the push-pull type actuator shown in FIGS. 3-6B, bias steering arrangement 230L uses a rack-type steering arrangement with actuator assembly 234L and steering rack 250L mounted transversely to left-side bogie beam 212L. As was discussed with respect to the preceding examples, it will be recognized that a similar rack-type bias steering arrangement for right-side main landing gear system 1 OR (shown in FIGS. 2A and 2B), will generally be a mirror image of the left-side steering arrangement 230L shown in FIG. 7.

In this particular example, control link 272L operatively connects steering rack 250L to pivotable or steerable aft axle 218L. Control link 272L includes actuator end 274L secured to actuator assembly 234L, and axle end 276L in pivotable engagement with axle 218L and bogie beam 212L about common left-hand pivot axis $A_L$. Steering rack 250L is in pivotable engagement with extendable control link arm 278L via rack pin 280L or the like. Similarly, control link body 282L has axle pivot pin 246L retained in bore 283L of control link arm 282L. As seen in FIG. 7, actuator assembly 234L can include actuator housing 284L mounted to bogie beam 212L at beam attachment regions 286A, 286B. Two transversely opposed linear actuators (e.g., hydraulic pistons) 288A, 288B are operable to laterally translate steering rack 250L in direction T by controlling differential hydraulic or other forces applied to actuator heads 292A, 292B.

Steering arrangement 230L can optionally be provided with locking mechanism 236L to prevent inadvertent movement of actuator assembly 234L, steering rack 250, control link 272L, and/or aft axle 218L. Locking mechanism 236L is shown in this example as a plunger lock, but any type of suitable steering lock for a landing gear axle can be used in its place.

Differential pressures can be applied to actuator heads 292A, 292B such that linear actuators 288A, 288B move leftward or rightward along direction T, causing actuator assembly 234L to respectively approach minimum or maximum stroke. This causes rack 250L and control link arm 274L to correspondingly move leftward or rightward along direction T, relative to the longitudinal axis of bogie beam 212L and the forward direction of aircraft 2 (shown in FIG. 1). In turn, this causes control link axle end 276L to pivot correspondingly clockwise or counterclockwise in direction P about pivot pin 246L and common left-hand pivot axis $A_L$. To achieve these example steering configurations and other configurations through the steering range, control link 272L can be configured to extend and retract along a longitudinal direction L.

In certain embodiments, control link 272L can be adapted to have a variable length so as to extend and retract in longitudinal direction L, thereby maintaining the connection with axle 218L during translation of steering rack 250L. A longitudinal dimension of control link 272L generally ranges between a first retracted length and a second extended length through a steering range of pivotable aft axle 218L. The longitudinal dimension of control link 272L corresponds to the changing distance between rack pin 280L and axle pivot pin 246L. Axle 218L can also be connected to bogie beam 212L and control link 272L such that a line through the axle diameter, and the corresponding ground contact point of the axle wheels (not shown), will trail common axis $A_L$ while still being pivotable therearound. Non-limiting examples of an extendable control link and a mechanical trail are described in a commonly assigned United States Patent Application entitled "Main Landing Gear Compact Axle Steering" having Ser. No. 13/774,218, filed on Feb. 22, 2013, and incorporated herein by reference in its entirety.

In the configuration shown in FIG. 7, actuator assembly 234L is positioned with rack 250L located away from a midpoint of the available actuation range. In this example, usable actuation space 256B on the right side of actuator assembly 234L is less than usable actuation space 256A on the left side of actuator assembly 234L. For reference this will be referred to as greater than or less than about 50% stroke on a 0% to 100% scale. Further, actuator assembly 234L can be offset to one side of the central longitudinal axis of bogie beam 212L. However, extendable control link arm 274L and rack pin 280L remain positioned such that substantially all of control link 272L generally overlies the central longitudinal axis of bogie beam 212L when aft axle 218L is oriented in bias steering position $S_0$.

When actuator assembly 234L is at or proximate a midpoint of the actuation range (e.g., usable actuation space 256A is approximately equal to usable actuation space 256B), axle 218L can be located proximate bias steering position $S_{bias}$. As was described in the preceding example embodiments, bias steering position $S_{bias}$ can be offset from neutral steering position $S_0$ by $\alpha_{bias}$ to tailor the steering range of the main landing gear axle(s) to the different respective maximum inboard and outboard turning radii $R_{in}$, $R_{out}$ (shown in FIGS. 2A and 2B).

Though FIG. 7 shows a telescoping control link, the example bias steering arrangement can alternatively be adapted to other rack-type landing gear steering arrangements such as a rack-and-pinion type steering arrangement. Non-limiting examples of rack-and-pinion type steering arrangements for aircraft landing gear are described in commonly assigned U.S. patent application Ser. No. 13/040,340, incorporated herein by reference.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bias steered landing gear system comprising:
   a bogie beam;
   a first landing gear axle pivotally mounted to the bogie beam, the first landing gear axle pivotable through an axle steering range which includes a maximum inboard steering angle and a maximum outboard steering angle, the steering angles defined relative to a neutral steering position; and
   a steering actuator assembly operable to apply a steering force to steer the first landing gear axle through the axle steering range between the maximum inboard steering angle and the maximum outboard steering angle, the maximum inboard steering angle being substantially larger than the maximum outboard steering angle;
   wherein the steering actuator assembly has an actuation range defined by a minimum stroke and a maximum stroke, the minimum stroke corresponding to one of the maximum inboard steering angle and the maximum outboard steering angle, and the maximum stroke corresponding to the other of the maximum inboard steering angle and the maximum outboard steering angle; and
   wherein a midpoint of the actuation range corresponds to a bias steering position of the first landing gear axle, the bias steering position forming a nonzero bias steering angle measured relative to the neutral steering position.

2. The bias steered landing gear system of claim 1, further comprising:
   a second landing gear axle mounted transversely to the bogie beam and longitudinally spaced apart from the first landing gear axle.

3. The bias steered landing gear system of claim 2, wherein the second landing gear axle comprises a fixed landing gear axle mounted forward of the first landing gear axle.

4. The bias steered landing gear system of claim 1, wherein the bias steering angle measures at least about 3° in either a clockwise or a counterclockwise direction.

5. The bias steered landing gear system of claim 1, wherein the bias steering angle measures at least about 6° in either a clockwise or a counterclockwise direction.

6. The bias steered landing gear system of claim 1, wherein the steering actuator assembly comprises a linear actuator having an actuator cylinder end secured to the bogie beam longitudinally spaced apart from the first landing gear axle, and an actuator piston end pivotally engaged with the first landing gear axle, the actuator cylinder end operable to provide a steering force to the first landing gear axle through the actuator piston end.

7. The bias steered landing gear system of claim 6, wherein the linear actuator is pivotally engaged to the first landing gear axle at a position outboard of an axle pivot point.

8. The bias steered landing gear system of claim 1, wherein the steering actuator assembly comprises:
   a steering rack mounted transversely to the bogie beam; and
   at least one linear actuator piston adapted to laterally translate the steering rack relative to the bogie beam.

9. The bias steered landing gear system of claim 8, further comprising:

a steering control link extending generally longitudinally between the steering rack and the first landing gear axle, the steering control link adapted to convert the lateral translation of the steering rack into a steering motion of the first landing gear axle.

10. A combination main landing gear system comprising a left-side bias steered landing gear system and a right-side bias steered landing gear system;
the left-side bias steered landing gear system comprising:
a left-side bogie beam;
a first left-side landing gear axle pivotally mounted to the left-side bogie beam, the first left-side landing gear axle pivotable through a left-side axle steering range which includes a maximum clockwise steering angle larger than a maximum counterclockwise steering angle, the maximum steering angles defined relative to a left-side neutral steering position; and
a left-side steering actuator assembly operable to apply a steering force to steer the first left-side landing gear axle through the steering range;
the right-side landing gear system comprising:
a right-side bogie beam;
a first right-side landing gear axle pivotally mounted to the right-side bogie beam, the first right-side landing gear axle pivotable through a right-side axle steering range which includes a maximum counterclockwise steering angle larger than a maximum clockwise steering angle, the maximum steering angles defined relative to a right-side neutral steering position; and
a right-side steering actuator assembly operable to apply a steering force to steer the first right-side landing gear axle through the right-side axle steering range;
wherein at least one of the left-side steering actuator assembly and the right-side steering actuator assembly has an actuation range defined by a minimum stroke and a maximum stroke, the minimum stroke corresponding to one of the maximum clockwise steering angle and the maximum counter clockwise steering angle, and the maximum stroke corresponding to the other of the maximum clockwise steering angle and the maximum counter clockwise steering angle; and
wherein a midpoint of the actuation range corresponds to a bias steering position of the respective first landing gear axle, the bias steering position forming a nonzero bias steering angle measured relative to the neutral steering position.

11. The combination main landing gear system of claim 10, wherein at least one of the left-side landing gear system and the right-side landing gear system further comprises:
a second landing gear axle mounted generally transversely to the respective bogie beam, the second landing gear axle longitudinally spaced apart from the respective first landing gear axle.

12. The combination main landing gear system of claim 10, wherein the nonzero bias steering angle measures at least about 3° in either a clockwise or a counterclockwise direction relative to the neutral steering position.

13. The combination main landing gear system of claim 10, wherein at least one of the left-side steering actuator assembly and the right-side steering actuator assembly comprises:
a linear actuator having an actuator cylinder end mounted to the respective bogie beam at a location longitudinally spaced apart from the respective first landing gear axle, and an actuator piston end pivotally engaged with the respective first landing gear axle at a position outboard of an axle pivot point, the actuator cylinder end operable to provide a steering force to the respective first landing gear axle through the actuator piston end.

14. The combination main landing gear system of claim 10, wherein at least one of the left-side steering actuator assembly and the right-side steering actuator assembly comprises:
a steering rack mounted transversely to the respective bogie beam; and
at least one linear actuator piston adapted to laterally translate the steering rack relative to the respective bogie beam to impart a steering force to the respective first landing gear axle.

15. An aircraft comprising:
at least one bias steered main landing gear system configured to be laterally spaced apart from an aircraft center line, and disposed on a lower portion of a fuselage between an aircraft nose section and an aircraft tail section, the at least one bias steered main landing gear system comprising:
a bogie beam;
a first landing gear axle pivotally mounted to the bogie beam; and
a steering actuator assembly operable to apply a steering force to steer the first landing gear axle through a steering range between a maximum inboard steering angle and a maximum outboard steering angle, the maximum inboard steering angle being substantially larger than the maximum outboard steering angle relative to a neutral steering position;
wherein the steering actuator assembly has an actuation range defined by a minimum stroke and a maximum stroke, the minimum stroke corresponding to one of the maximum inboard steering angle and the maximum outboard steering angle, and the maximum stroke corresponding to the other of the maximum inboard steering angle and the maximum outboard steering angle, a midpoint of the actuation range corresponding to a bias steering position of the first landing gear axle, the bias steering position forming a nonzero bias steering angle measured relative to the neutral steering position.

16. The aircraft of claim 15, wherein the at least one bias steered main landing gear system comprises a left-side bias steered main landing gear system and a right-side bias steered main landing gear system, the left-side and right-side bias steered main landing gear systems laterally spaced equally from the aircraft center line.

17. The aircraft of claim 15, wherein a second landing gear axle is mounted generally transversely to the bogie beam and longitudinally spaced apart from the first landing gear axle, the first landing gear axle mounted aft of the second landing gear axle.

18. The aircraft of claim 15, wherein the nonzero bias steering angle is at least about 3° in either a clockwise or a counterclockwise direction relative to the neutral steering position.

* * * * *